US012001063B2

(12) United States Patent
Larkin

(10) Patent No.: US 12,001,063 B2
(45) Date of Patent: Jun. 4, 2024

(54) FIBER INSPECTION TOOL

(71) Applicant: Westek Electronics, Inc., Watsonville, CA (US)

(72) Inventor: Kevin B. Larkin, Pebble Beach, CA (US)

(73) Assignee: Westek Electronics, Inc., Watsonville, CA (US)

( * ) Notice: Subject to any disclaimer, the term of this patent is extended or adjusted under 35 U.S.C. 154(b) by 112 days.

(21) Appl. No.: 17/839,852

(22) Filed: Jun. 14, 2022

(65) Prior Publication Data

US 2022/0308292 A1 Sep. 29, 2022

Related U.S. Application Data

(63) Continuation of application No. 17/324,462, filed on May 19, 2021, now Pat. No. 11,385,412.

(60) Provisional application No. 63/030,066, filed on May 26, 2020.

(51) Int. Cl.
G02B 6/38 (2006.01)
G02B 21/00 (2006.01)
G02B 21/36 (2006.01)
G01M 11/00 (2006.01)

(52) U.S. Cl.
CPC ........... *G02B 6/385* (2013.01); *G02B 6/3809* (2013.01); *G02B 6/3898* (2013.01); *G02B 21/0004* (2013.01); *G02B 21/362* (2013.01); *G01M 11/30* (2013.01)

(58) Field of Classification Search
CPC .... G02B 6/385; G02B 6/3898; G02B 21/004; G02B 21/008; G02B 21/36; G02B 21/362
See application file for complete search history.

(56) References Cited

U.S. PATENT DOCUMENTS

| 5,196,899 | A | * | 3/1993 | Serwatka | G02B 6/4292 |
| | | | | | 356/73.1 |
| 6,508,593 | B1 | * | 1/2003 | Farnsworth | G02B 6/3825 |
| | | | | | 385/134 |
| 7,356,236 | B1 | | 4/2008 | Huang et al. | |
| 7,373,069 | B2 | * | 5/2008 | Lazo | G02B 6/4469 |
| | | | | | 385/134 |

(Continued)

FOREIGN PATENT DOCUMENTS

CN 110262027 A 9/2019
WO 2018010849 A1 1/2018

*Primary Examiner* — Michael Stahl

(57) ABSTRACT

The purpose of this invention is to create a low cost, easy to use, fiber end face and or connector inspection tool component that easily adapts and converts most all mobile communication devices with camera, screen and software capabilities into a microscope. The invention encapsulates and holds firm a fiber connector body and or fiber connector bodies and or ferrule housing or ferrule housings for the purpose of viewing the cleanliness and quality of the fiber end face and or faces. A Fiber end face is the component area and or areas the embodies the fiber core and or fiber cores, fiber ferrule end and or ferrule ends and fiber related end component and or components that are instrumental in the mating with other like components with fiber connector plug end faces and or related optical fiber components for the purpose connectors and splices prior to connecting and or join optical fibers where a connect/disconnect capability is required.

15 Claims, 11 Drawing Sheets

(56) References Cited

U.S. PATENT DOCUMENTS

| | | |
|---|---|---|
| 9,800,330 B1 | 10/2017 | Yusuf et al. |
| 2006/0204200 A1* | 9/2006 | Lampert .............. G02B 6/3849 385/139 |
| 2007/0217749 A1* | 9/2007 | Jong .................... G02B 6/3849 385/88 |
| 2013/0300919 A1 | 11/2013 | Fletcher et al. |
| 2014/0327735 A1 | 11/2014 | Ruchet et al. |
| 2015/0062564 A1 | 3/2015 | Kowalczyk et al. |
| 2015/0116699 A1 | 4/2015 | Meek et al. |
| 2015/0171959 A1 | 6/2015 | Kim et al. |
| 2015/0177147 A1 | 6/2015 | Mangan et al. |
| 2016/0004057 A1 | 1/2016 | Lin et al. |
| 2017/0119250 A1 | 5/2017 | Kolachalama et al. |
| 2017/0199364 A1 | 7/2017 | Doric et al. |
| 2018/0180866 A1 | 6/2018 | Kaminaga |
| 2020/0019042 A1 | 1/2020 | Crispin |

* cited by examiner

FIBER INSPECTION TOOL

PRIORITY

This application is a continuation application of and claims priority to and benefit of co-pending U.S. patent application Ser. No. 17/324,462, filed on May 19, 2021, entitled "FIBER INSPECTION TOOL" by Kevin B. Larkin, which is herein incorporated by reference in its entirety.

U.S. patent application Ser. No. 17/324,462 claims priority to and benefit of U.S. Provisional Application No. 63/030,066, filed May 26, 2020, entitled "FIBER INSPECTION TOOL" by Kevin B. Larkin, which is herein incorporated by reference in its entirety.

TECHNICAL FIELD OF INVENTION

This invention was created for the purpose of turning a cell phone and camera and software and has to do with the ever-advancing field of fiber optics which will be a major transport carrier of 5G, from now and well into the future.

Fiber optics technology continues to advance as well as the equipment that support it. For instance, in the beginning, when fiber optic connectorized test and patch cords were introduced, most all connectorized fiber jumper cords were made in clean rooms. The reason for the clean room environment was that the glass terminations had to be particle free. Today's technology allows the fiber cables to be connectorized to the fiber connectors in the outside world where these field installed or serviced fiber plug-in connectors are exposed to the outside elements, (wind, dust and dirt) during the field assembly.

An Optical fiber connector terminates the end of an optical fiber and enables quicker connection and disconnection than fiber splicing. The connectors mechanically couple and align the cores of the fiber so light can pass. Better connection loose very little light due to reflection or misalignment of the fibers.

Optical fiber connectors are used to join optical fibers where a connect/disconnect capability is required. Fiber splicing/splices is where more permanent connections are required. Fiber connectors due to the polishing and tuning procedures that may be incorporated into optical connector manufacturing, connectors are often assembled onto the optical fiber in a supplier's manufacturing facility. However, the assembly and polishing operations involved can be performed in the field, for example, to terminate long runs at a patch panel. Optical fiber connectors are used in telephone exchanges, for customer premise wiring, and in outside plant applications to connect equipment and cables and to cross connect cables.

Most optical fiber connectors are manufactured/constructed with a means of providing a spring-loaded type action as to allow the fiber end face and or end faces when plugged into a jack to be connected to another fiber cable connector for the purpose of making a light transmission link. The spring-loaded action assists in effectively aligning and connecting the ferrule and or ferules of the fiber plug-in connectors when inserted in the jack and are pressed together when the connectors are mated. The resulting glass to glass or plastic to plastic contact eliminates signal losses that would be caused by an air gap or mis-alignment between the joined fiber or fiber end faces. Testing of fiber optic connectors can be quantified by insertion loss and return loss test measurements. The testing measurements and their parameters are known and defined in IEC standard 61753-1. The standard gives five grades for insertion loss from A (best) to D (worst), and M for multimode. The other parameter is return loss, with grades from 1 (best) to 5 (worst).

There are a variety of optical fiber connectors available, but SC and LC connectors are the most common types of connectors on the market. Typical connectors are rated to 500 to 1000 mating cycles. The main difference among types of connectors are dimensions and methods of mechanical coupling with the mating of the fiber core and ferrule ends as described above.

Field connection of the fiber connectors to the cable is commonly found in the outside plant world, which is an environment with application that may require connectors be located underground, or on outdoor walls and utility cabinets and also utility poles. Many of these OSP connectors are exposed to the elements when testing and are usually enclosed in protective enclosures in these settings. When testing occurs, the unplugged connecter end faces can be exposed to the elements and the possibility of getting scratched and or dirty.

Whether the fiber connections are found in the dirty environment of the outside plant world or the protected environment of a data center. Dust and dirt or the possibility or the possibility of a fiber end face being scratched can result in transmission performance errors that can cause problems to service due to incorrect cleaning and or polishing. This can result in a technician going back to trouble shoot a fiber transmission or incorrect testing that could have been eliminated if the proper visual inspection testing had been completed prior to the connection of the fiber connectors fiber core, and ferrule for contaminants or scratches.

BACKGROUND

Fiber connector and or connectors inspection is usually done prior to the fiber cable and or fiber plug-ins installation into a connector or adapter and or an application where the fiber plug-end and or plug-ends will be mated to another fiber, fiber core and or fiber connector body. The human eye in most all cases cannot perform a true visual inspection of these mentioned fiber end faces due to their minute size. This can only be achieved through the use of a magnification tool. Most magnification tools that are designed for this type of inspection are expensive and have to be carried as a stand-alone unit.

When a fiber technician is initially inserting or re-inserting fiber cable (or cables) connectors into jacks or equivalent connectors. One of the standard operating procedures is to clean and inspect the end faces on the fiber plug-ins. During this process it is very common to see a technician visually inspect these fiber end faces when cleaning before insertion. For clarity the fiber end face is the end of the fiber element comes through the white ferrule that holds it in place inside the fiber connector.

The end faces can easily be scratched or become contaminated during pre-installation, installation and or repair process. This is especially common when the fiber connectors are not plugged in and the end faces are left exposed without a cover or covers to protect them during the installation process.

During the installation of the fiber connectors. The cleaning process of the mentioned fiber end faces can range from being wiped with an alcohol base liquid in the form of a cotton swab or other type of cleaning material or the cleaning process can also be performed in a dry manner of wiping the fiber end faces with the specified type of Materials.

Importance of the cleaning process often times is neglected when a technician thinks they can blow on the end faces and then wipe it on their T-shirt much in the same manner of cleaning your eyeglasses.

The problem with this process and not visually inspecting with a microscope or equivalent visual inspection tool and cleaning properly is that any kind of dirt impurity or scratches on the fiber connector end face and or end faces can cause distortion (loss and or reflection) or restriction of the light signals being transmitted.

Another words, a technician can install a brand "new" fiber system with everything right out of the box. Plug it in and the system will not work correctly because of this type contamination or scratches.

What is common today for visual inspection is the use of a large handheld microscope system or an electronic test set that has a microscope connection to allow a magnified inspection of the end face to be transmitted back through the test set screen and or the microscope lense.

Both these types of tools can be expensive and need to be stored as an additional ancillary piece of equipment.

DETAILED DESCRIPTION

The purpose of this invention is to create and adaptive system that will convert the typical cell phone with a camera into a microscope that can accurately secure a fiber cord connector plug-in to eliminate any end face movement which could cause incorrect readings on the end face or end faces.

The other purpose of this invention is to allow the cell phone to act through its circuitry as a focal meter to adjust the clarity of the end phase when looking through the cell phone screen. Example is if one were to hold fiber connector in face up against the camera on the cell phone there are two problems. First problem is any movement of the connector across the lands would dictate false readings or an accurate reading. The other problem that would occur is that you don't have enough hands to be able to focus the cell phone screen to give a clear picture of the interfaces while trying to hold the fiber connector in a steady position to indicate a clear reading.

This invention eliminates the need for one to hold the fiber connectors physically over the camera lense on the cell phone when trying to project the end face of the fiber connectors with the use of a cell phone or equivalent type of phone.

This tool incorporates a fiber connector socket in conjunction with a microscope lens in conjunction with a lighting system to shine on the end faces with the complete package being able to be slide onto or over and or adhere to or clamped onto the cell phone housing and or cell camera lens while holding in place the fiber connector and or end-faces.

EXPLANATION OF NUMBERED PICTURE DESCRIPTIONS IN FIGURES

Figure 1:
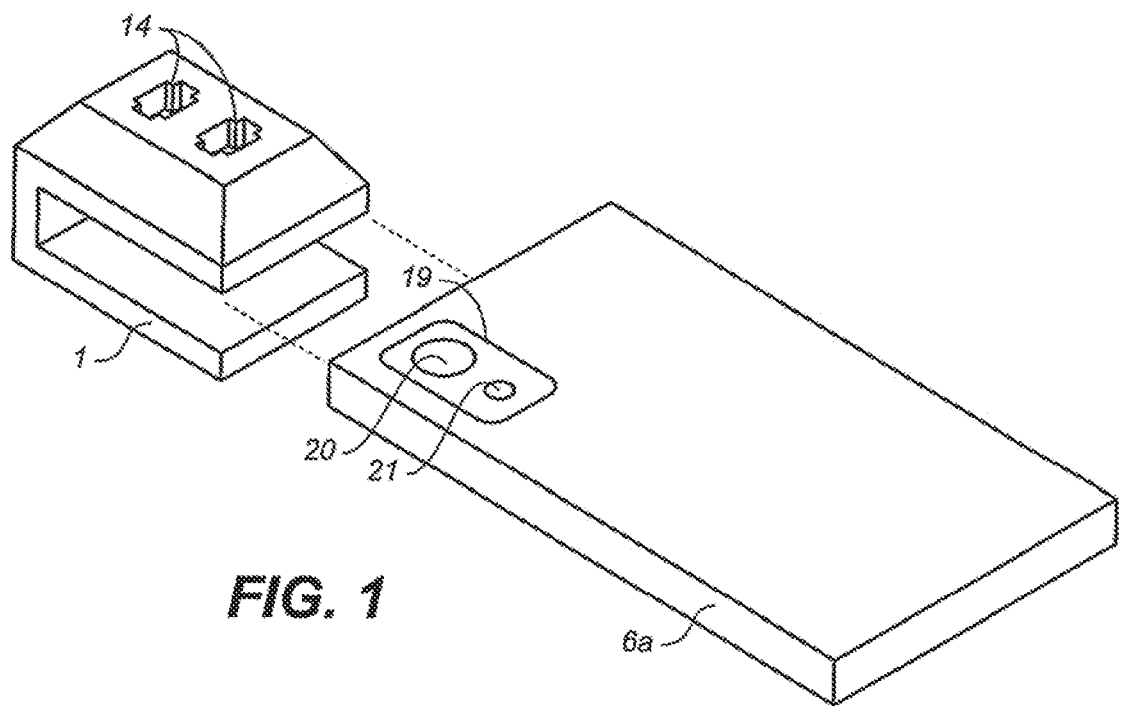
FIG. 1 is a first perspective view of the cell phone microscope slide on adapter with built-in fiber optic plug jack cavities showing the application of said invention and its mating with a cell phone camera and multi-function LED.
Figure 2:
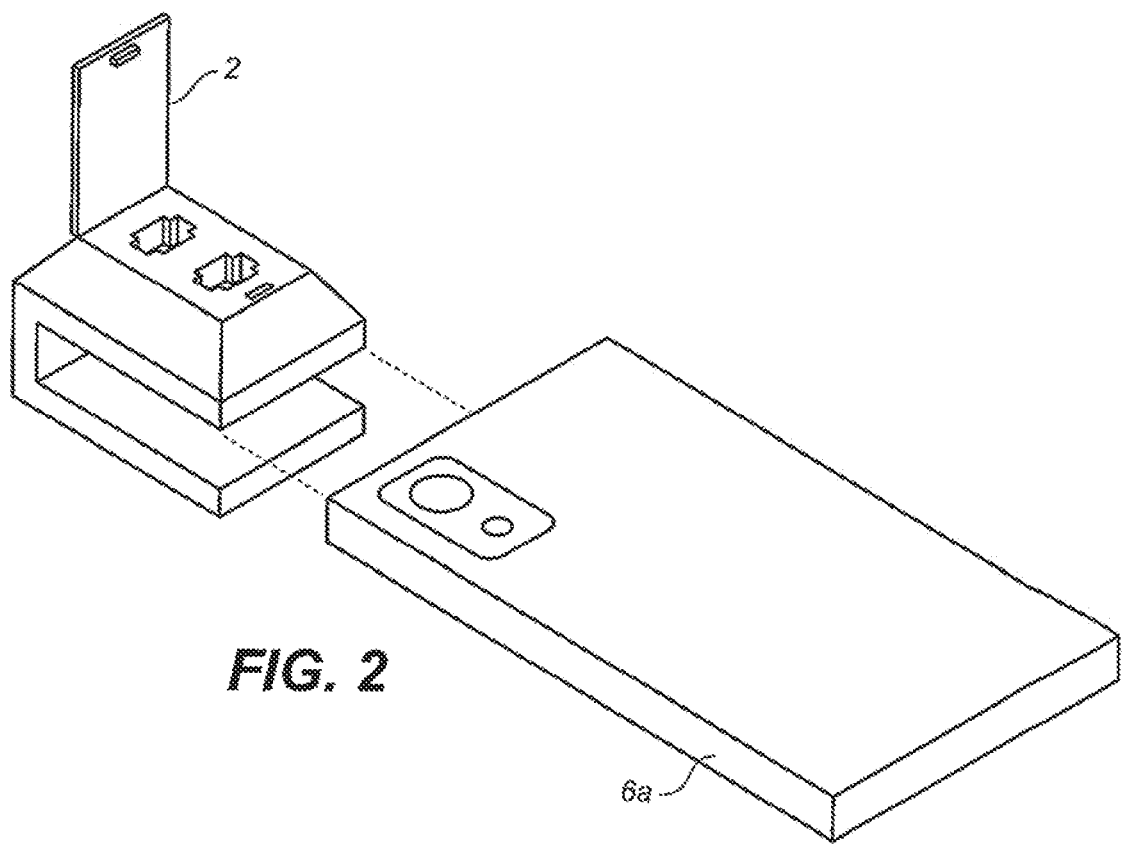
FIG. 2 is a second perspective view of the cell phone microscope slide on adapter with built-in fiber optic plug jack cavities showing the application mentioned in FIG. 1 with the addition of a hinged/opening and closure function to protect the fiber jack connector cavity and or cavities from dust and or debris when not in service.
Figure 3:
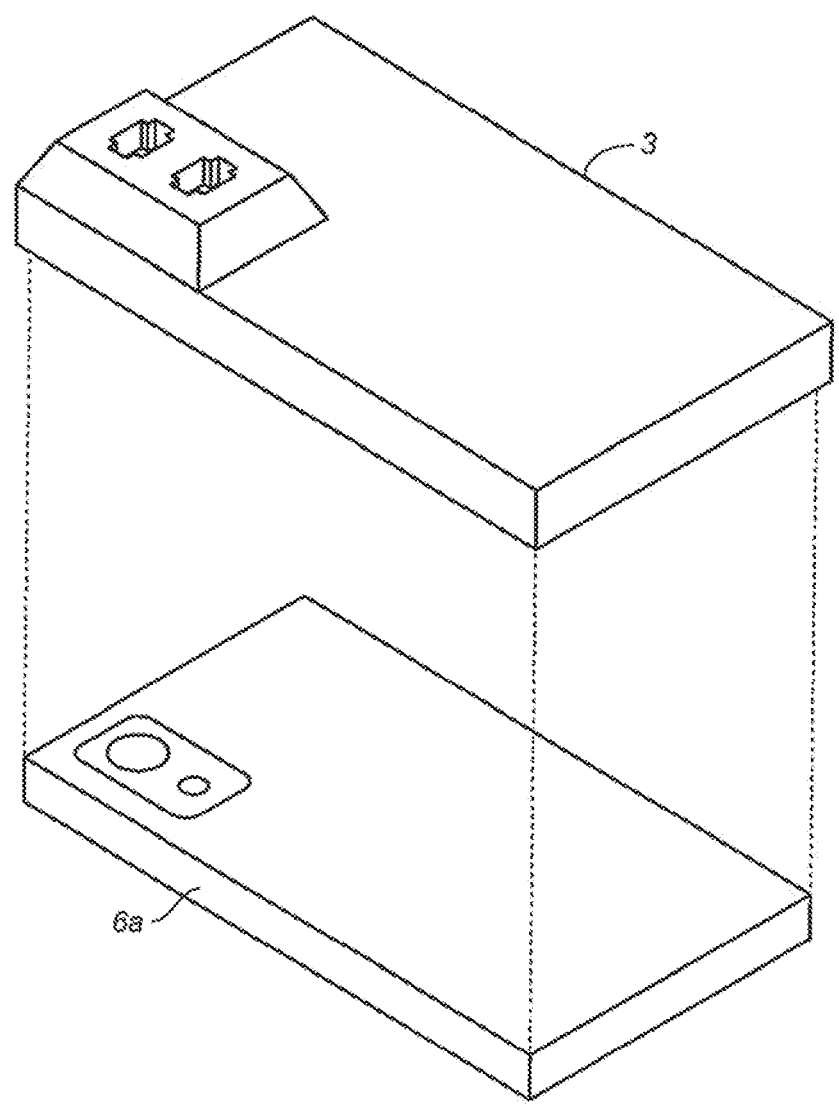
FIG. 3 is the detail perspective view of the cell phone microscope adapter with built in with fiber optic jacks showing the application of said invention molded in a full-size protective cell phone case.
Figure 4:
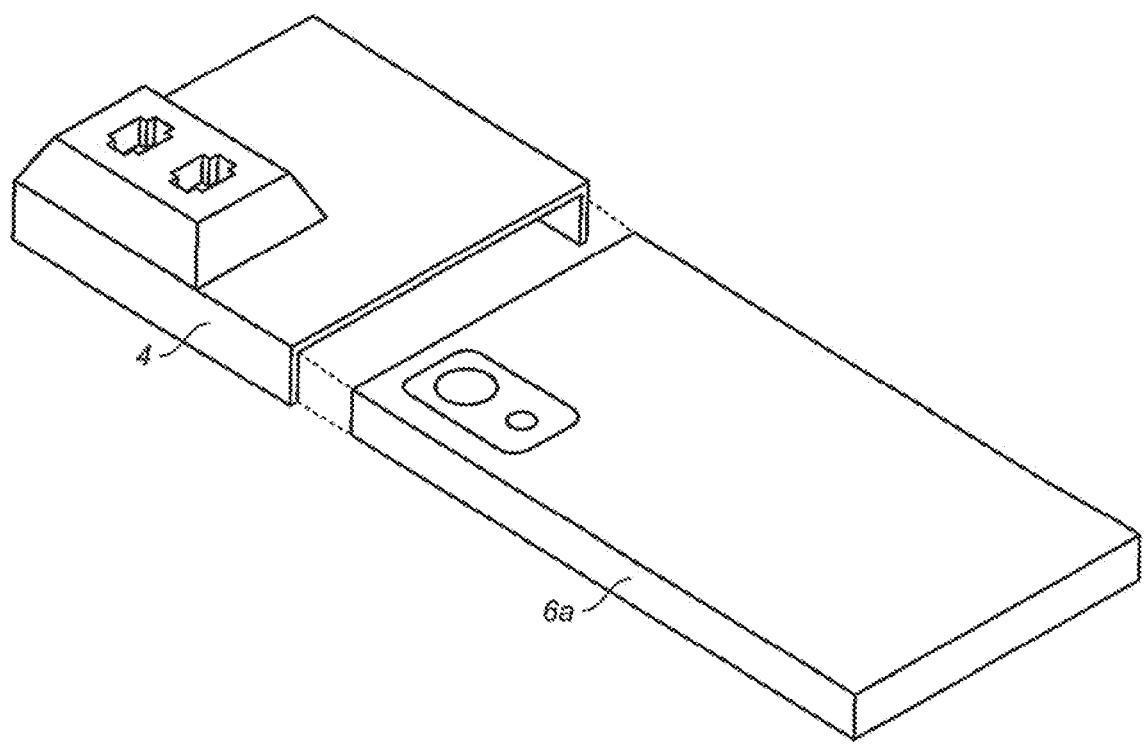
FIG. 4 is a perspective view of a version of a slide on half case.
Figure 5A:
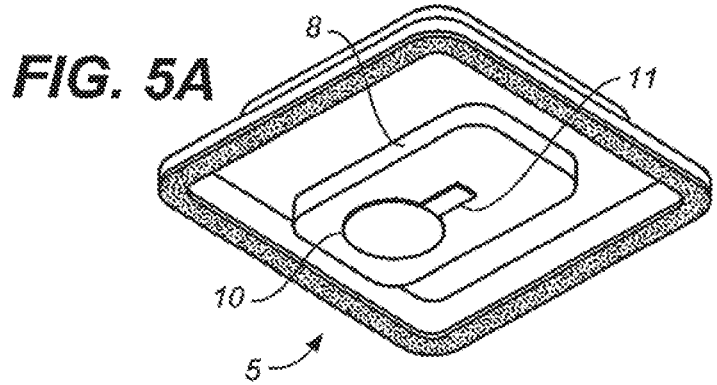
FIG. 5A is a detail perspective view from the underside of the adhesive base version and application with ancillary snap-in microscope and light source.
Figure 5B:
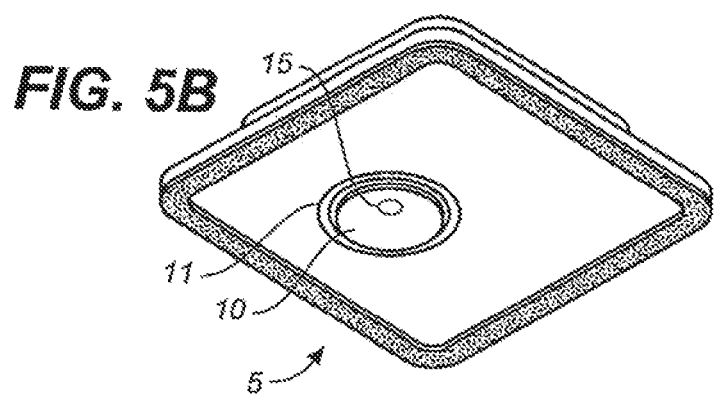
FIG. 5B is a second detail perspective view of FIG. 5(A) with an internal built-in magnifying lens and LED or an equivalent light source and or light reflector.
Figure 5C:
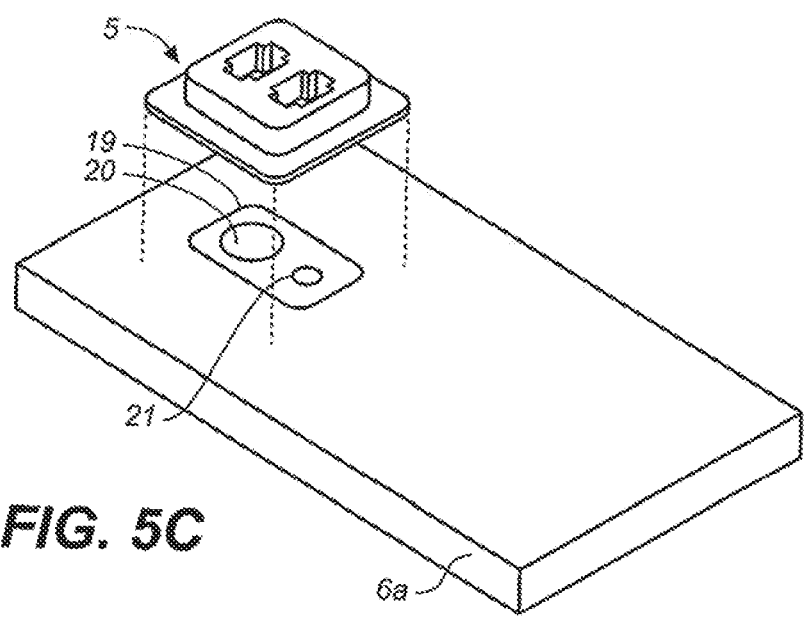
FIG. 5C is a perspective view of 5A or 5B applied to cell phone case.
Figure 5D:
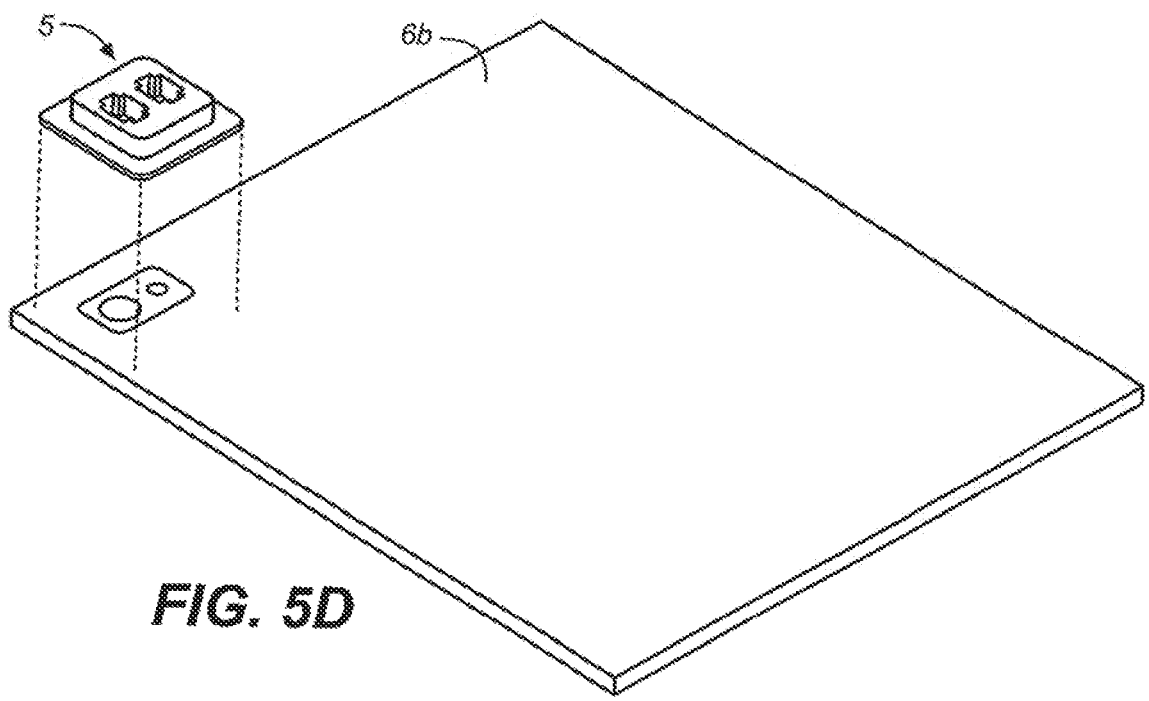
FIG. 5D Is a perspective view of 5A or 5B attached to tablet.
Figure 5E:
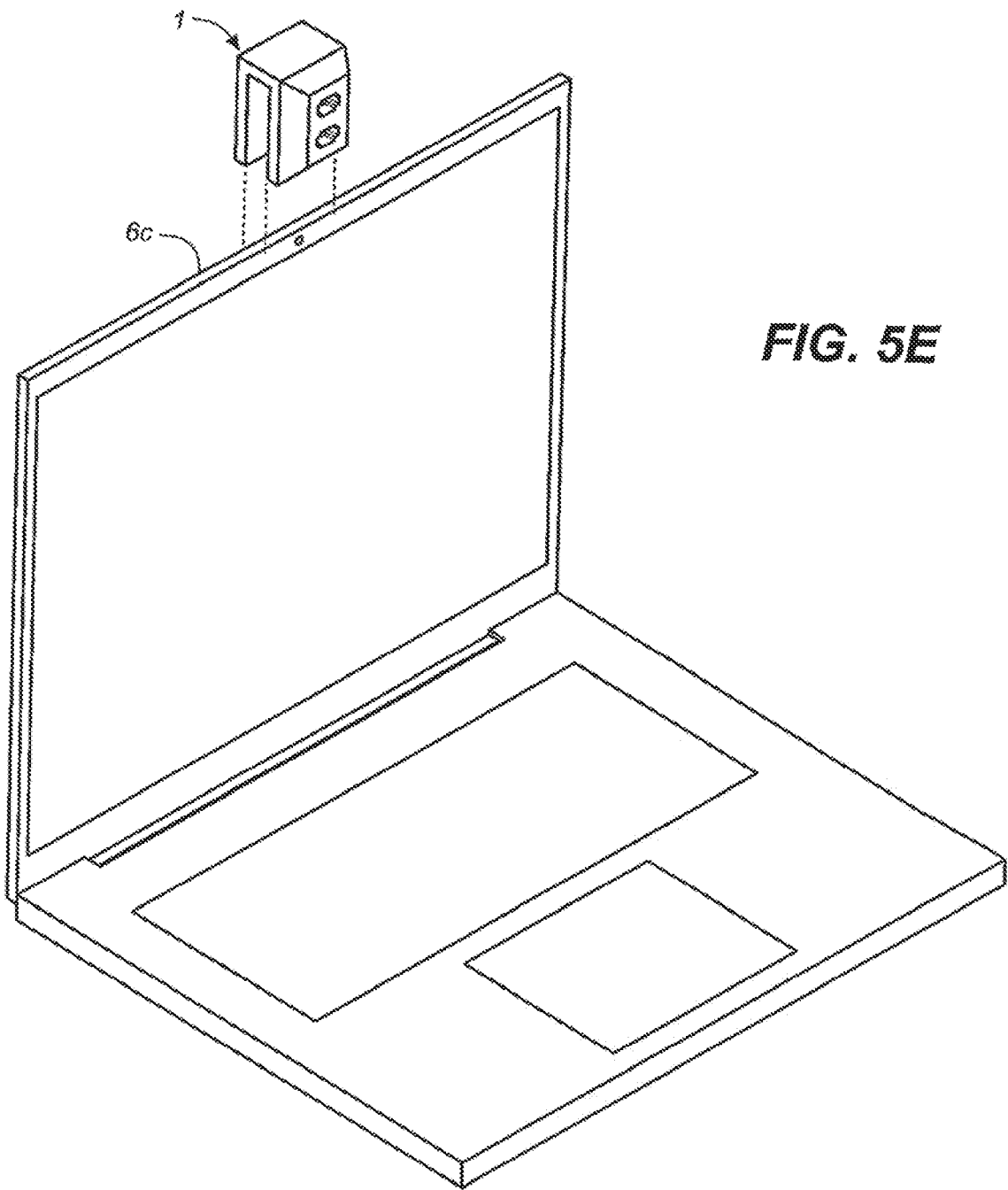
FIG. 5E Is a perspective view of 5A or 5B attached to a laptop Computer.
Figure 6:
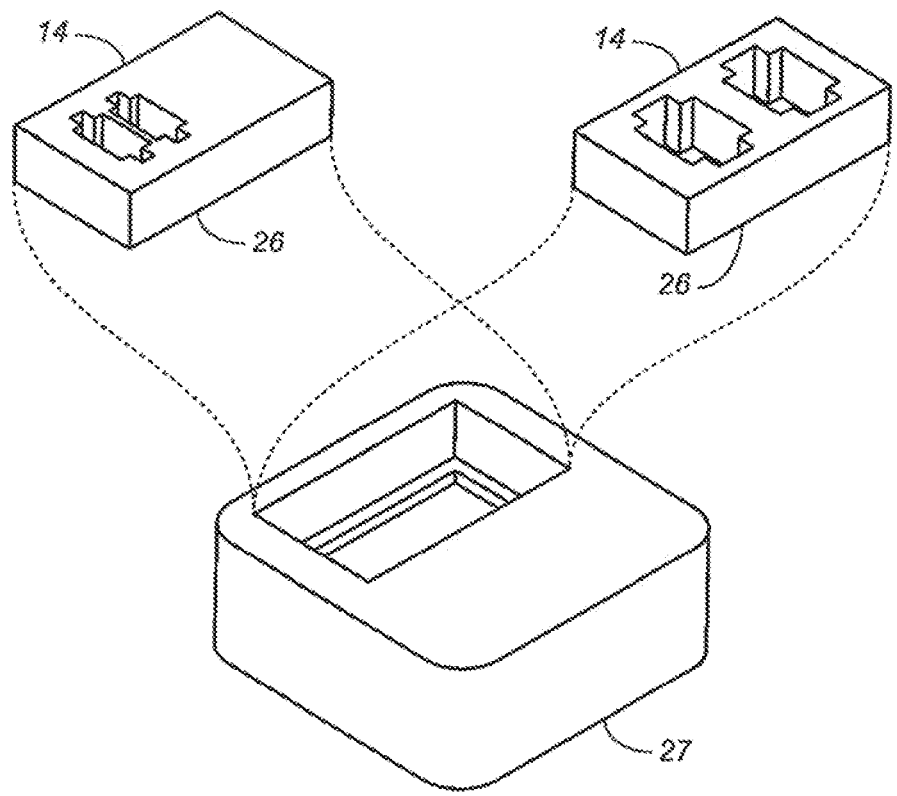
FIG. 6 Is a cross sectional view of the module outlined in the claims of this patent with the fiber plug cavities molded into an insert and or inserts that can be exchanged while not removing the module body from its permanent or semipermanent placement.
Figure 7:
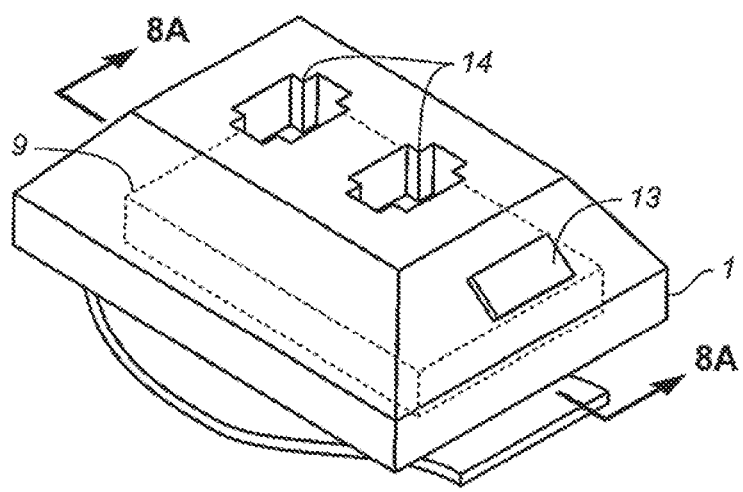
FIG. 7 is a cross sectional perspective view of the female fiber optic plug cavities and or cavity module with a larger internal cavity shown in a dotted line for the purpose of supporting and housing components shown in FIGS. 8A and B and supported in FIGS. 5A and 5B.
Figure 8A:
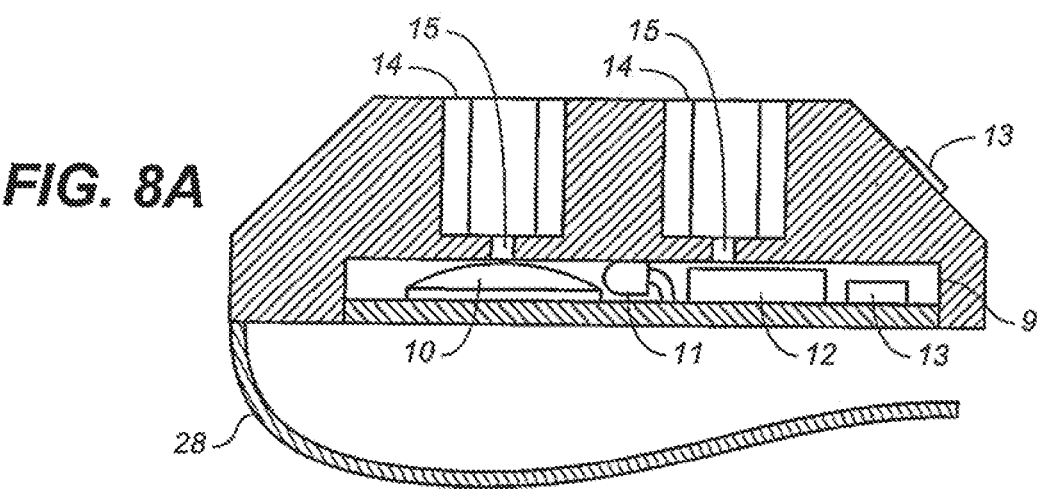
FIG. 8A is a cross sectional view of the module with the internal cavity outlined in FIG. 7 to support and contain internal components to illuminate and or magnify said fiber end faces when aligned in position with said ancillary equipment camera lens.
Figure 8B:
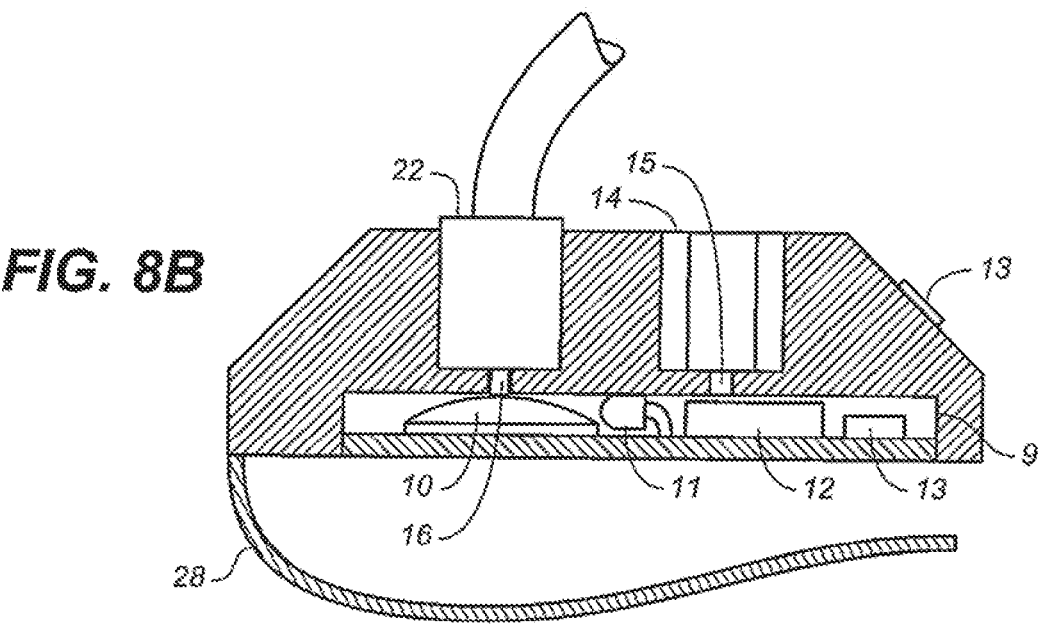
FIG. 8B is a cross sectional view of the module showing the same as FIG. 8A but with the addition of an inserted fiber connector pictured and outlined in description 22 and 16.
Figure 8C:
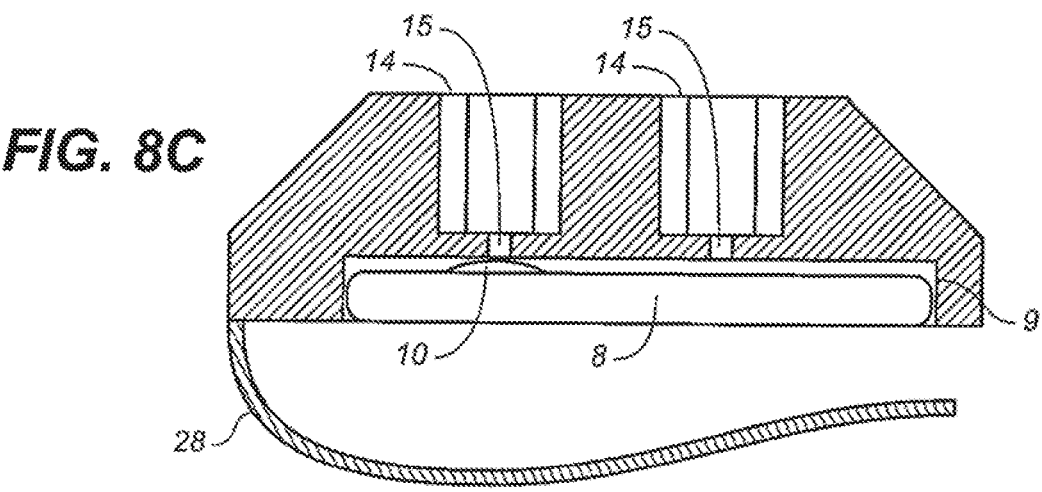
FIG. 8C is a cross sectional view of the module with the internal cavity outlined in FIG. 7 to support and contain an aftermarket devise to illuminate and or magnify said fiber end faces when aligned in position with said ancillary equipment camera lens.
Figure 9A:
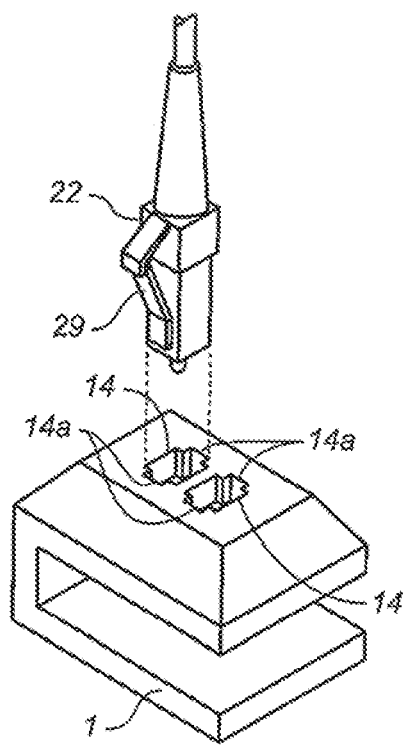
FIG. 9A is a perspective view presentation of a male plug fiber plug ready for insertion into said invention outlined in the figures above.
Figure 9B:
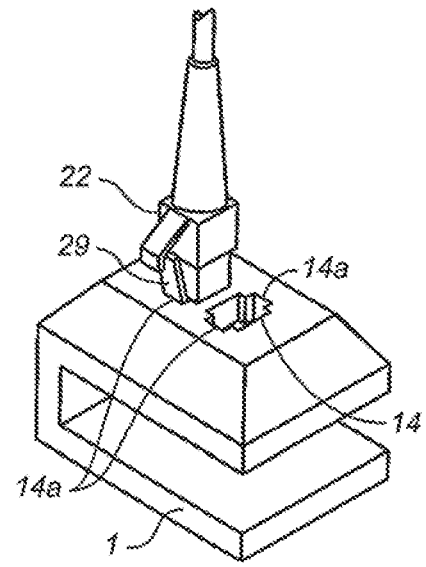
FIG. 9B is a perspective view presentation of the male fiber single plug inserted/mated to said invention described above.
Figure 9C:
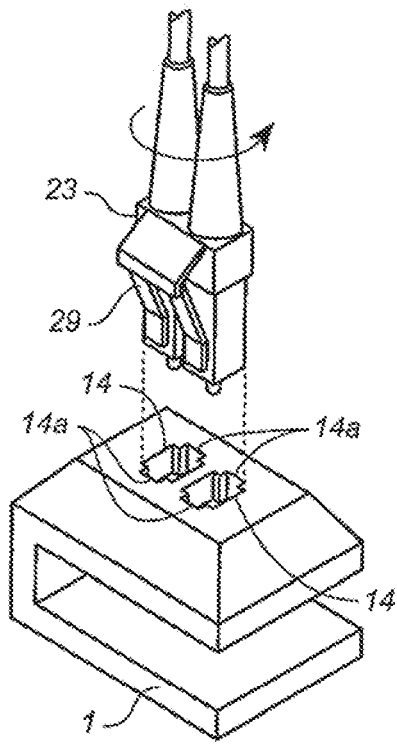
FIG. 9C is a perspective view of a duplex (double) fiber ready for insertion. After insertion and initial insertion said duplex (dual) plug. Duplex fiber plug must be removed, rotated 180 degrees and reinserted for visual inspection of said second fiber end faces. 14*a* allows for this function.
Figure 10:
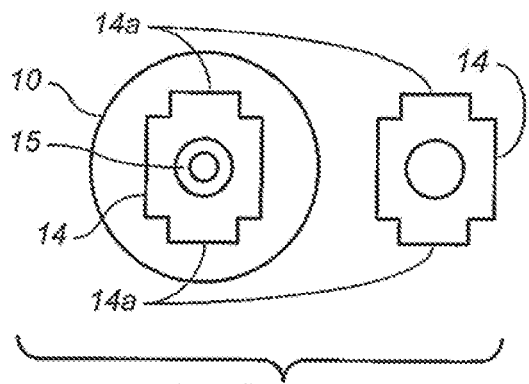
FIG. 10 is a schematic overhead view of the cavity floor 14 with the ferrule alignment guide 15 with magnification lens 10 positioned below while the second fiber cavity support system on the right is a storage cavity during duplex plug inspection.
Figure 11:
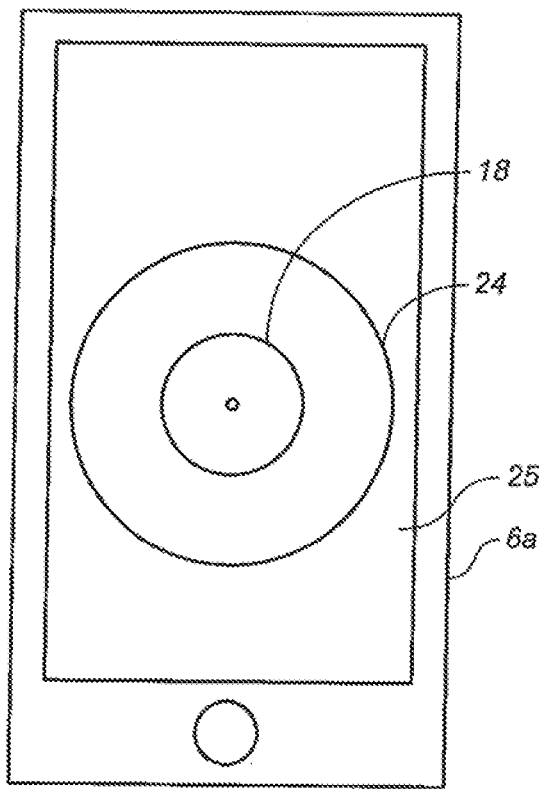
FIG. 11 is a perspective view of a cell phone screen displaying a fiber plug-in end face 17 picture magnified 400× to present clear fiber end face visual 24 of the fibercore, the cladding and the ferrule 18 for the purpose inspection.
Figure 12:
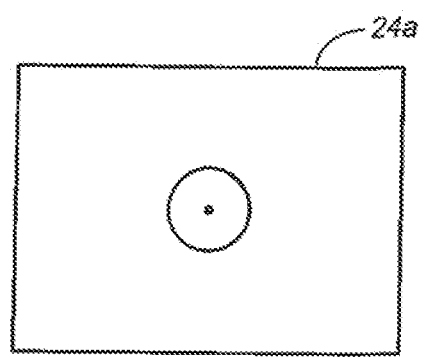
FIG. 12 is a schematic view of a clean fiber end face on a monitor screen 24*a*.
Figure 13:
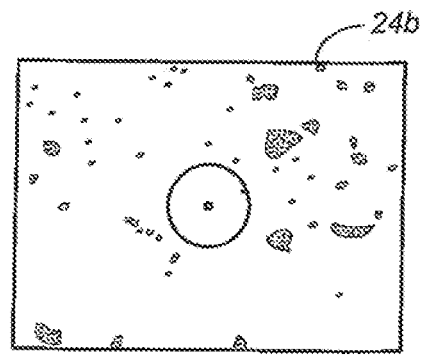
FIG. 13 Is a schematic view of a dirty fiber end face on a monitor screen 24*b* that needs to be cleaned.
Figure 14:
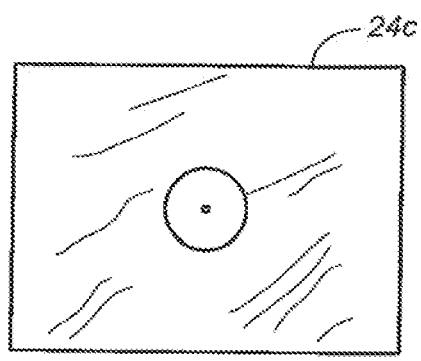
FIG. 14 is a schematic view of a scratched fiber end face on a monitor screen 24c that need to be replaced.
Figure 15:
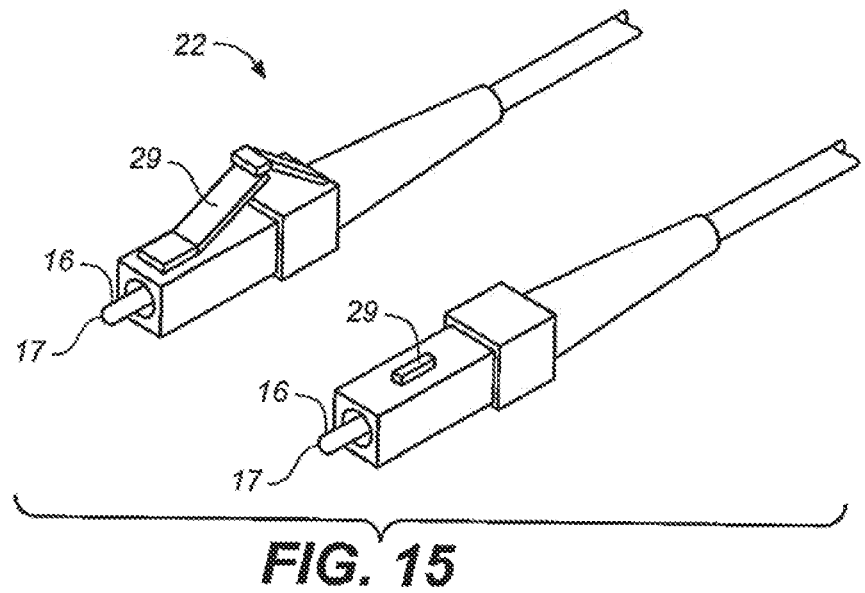
FIG. 15 is a perspective view of a version of a simplex (single) fiber plug 22 that displays alignment guide and locking guide 29 affixed to the plug body of the connectorized fiber plug, with ferrule 16 and fiber end face 17 displayed.
Figure 16:
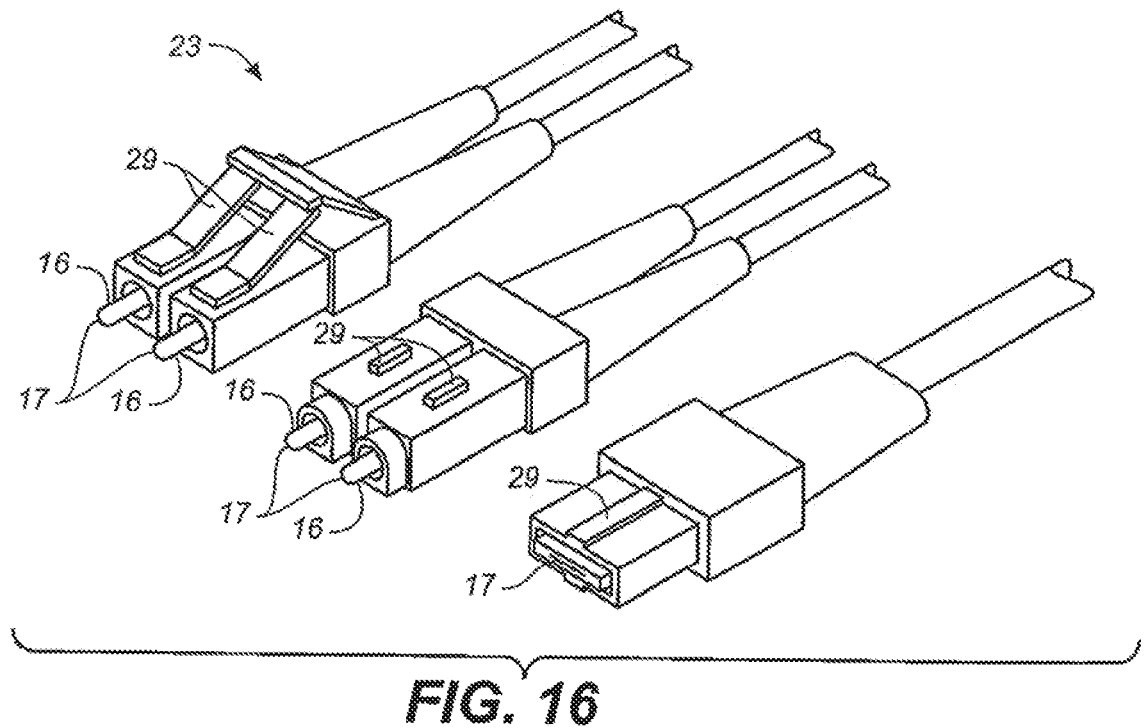
FIG. 16 is a perspective view of a version duplex (dual) fiber plugs 23 that displays alignment guide and locking guides 29 affixed to the plug bodies of the connectorized plug. Also shown on the lower right side of FIG. 16 is one of many new style fiber plug types that house numerous fibers but features a larger end face 17 with multiple fibers. The alignment concept 29 is still necessary in this and future fiber plug body housings of the purpose of fiber count and location identification on multiple fiber core plugs.

1) Slide on module housing with female insert cavities
2) Slide on module housing with dust cover with female insert cavities
3) Slide on full phone case module housing with female insert cavities
4) Slide on half case module housing with female insert cavities
5) Adhesive backed module housing with female insert cavities
6) Cell phone
7) Fiber component female insert/inserts
8) After market device module
9) Module component cavity
10) Magnification lens
11) Light sources
12) Battery
13) Push on/off switch
14) Fiber plug cavity support mechanism
15) Ferrule alignment guide system
16) Ferrule
17) Fiber end face
18) Fiber core, cladding, ferrule
19) Cell phone camera
20) Camera lens
21) Cell Phone light source
22) Connectorized fiber plug-ins "simplex" single plug
23) Connectorized fiber plug-ins "duplex" single and or dual plug
24) End face visuals (includes 24a, 24b, 24c depicted in FIG. 11-14
25) Cell phone camera picture
26) Modular inserts male
27) Modular insert housing module
28) Spring clip
29) Align guides/locking and non-locking

What I claim is:

1. A module housing case comprising:
a camera lens alignment feature coupled to said module housing case;
a plurality of interchangeable fiber optic component housings defining a plurality of cavities, said plurality of cavities structured to receive a respective fiber optic connector; and
said plurality of cavities formed at least partially into said module housing case.

2. The module housing case of claim 1, wherein each of said plurality of cavities include a respective mating component coupled thereto, each of said respective mating components structured for receiving said respective fiber optic connector.

3. The module housing case of claim 1, wherein said camera lens alignment feature is selected from a group consisting of: a snap on mechanism, a slide on mechanism, a partial case, a full case, an adhesive, and a spring attached case.

4. A module housing case comprising:
a camera lens alignment feature coupled to said module housing case;
a plurality of interchangeable fiber optic component housings defining a plurality of cavities, each of said plurality of interchangeable fiber optic component housings sized to receive a fiber optic connector and retain said fiber optic connector with a frictional force; and
said plurality of cavities formed at least partially into said module housing case.

5. The module housing case of claim 4, wherein each of said plurality of cavities includes a respective mating component structured for receiving a respective fiber optic connector.

6. The module housing case of claim 5, wherein said mating component is selected from the group consisting of a guide, a locking component, and a locking guide.

7. The module housing case of claim 4, wherein said camera lens alignment feature is selected from the group consisting of: a snap on mechanism, a slide on mechanism, a partial case, a full case, an adhesive, and a spring attached case.

8. The module housing case of claim 4 further comprising:
a ferrule guide coupled to at least one of said plurality of cavities.

9. The module housing case of claim 4 further comprising:
a magnification component coupled to at least one of said plurality of cavities.

10. A module housing case comprising:
a plurality of interchangeable fiber optic component housings defining a plurality of cavities, each of said plurality of interchangeable fiber optic component housings sized to receive a fiber optic connector and retain said fiber optic connector with a frictional force;
said plurality of cavities formed at least partially into said module housing case; and
a magnification component coupled to at least one of said plurality of cavities.

11. The module housing case of claim 10, wherein each of said plurality of cavities includes a respective mating component structured for receiving a respective fiber optic connector.

12. The module housing case of claim 11, wherein said mating component is selected from the group consisting of a guide, a locking component, and a locking guide.

13. The module housing case of claim 10 further comprising:
a camera lens alignment feature coupled to said module housing case.

14. The module housing case of claim 13, wherein said camera lens alignment feature is selected from the group consisting of: a snap on mechanism, a slide on mechanism, a partial case, a full case, an adhesive, and a spring attached case.

15. The module housing case of claim 10 further comprising:

a ferrule guide coupled to at least one of said plurality of cavities.

\* \* \* \* \*